United States Patent [19]

Hodemaekers

[11] 3,805,093

[45] Apr. 16, 1974

[54] TRANSISTOR CIRCUIT

[75] Inventor: Andreas Marie Hodemaekers, Emmasingel, Eindhoven, Netherlands

[73] Assignee: U.S. Philips Corporation, New York, N.Y.

[22] Filed: Apr. 20, 1972

[21] Appl. No.: 245,781

[30] Foreign Application Priority Data

Apr. 29, 1971 Netherlands .......................... 7105838

[52] U.S. Cl. ........... 307/235 R, 307/291, 330/30 D, 330/38 M

[51] Int. Cl. ............................................. H03k 5/20

[58] Field of Search .......... 307/235, 291; 330/30 D, 330/38 M

[56] References Cited

UNITED STATES PATENTS

| | | | |
|---|---|---|---|
| 3,689,752 | 9/1972 | Gilbert | 307/229 X |
| 2,946,897 | 7/1960 | Mayo | 307/216 X |
| 3,094,632 | 6/1963 | Wartella | 307/216 |
| 3,408,533 | 10/1968 | Gates | 330/30 D |
| 3,700,929 | 10/1972 | Frederiksen | 307/291 |

FOREIGN PATENTS OR APPLICATIONS

| | | | |
|---|---|---|---|
| 2,024,806 | 12/1970 | Germany | 330/30 D |

*Primary Examiner*—John Zazworsky
*Attorney, Agent, or Firm*—Frank R. Trifari

[57] ABSTRACT

A transistor circuit, in particular a trigger circuit, comprising two input stages for converting input voltages into control currents. Provision is further made of two current mirrors for taking up the control currents, each input stage being connected to an input terminal of one of the current mirrors and to an output terminal of the other of the current mirrors. By chosing the product of the mirror ratios of the current mirrors greater than unity a trigger circuit having satisfactory supply voltage suppression is obtained.

17 Claims, 3 Drawing Figures

TRANSISTOR CIRCUIT

Figure 1:
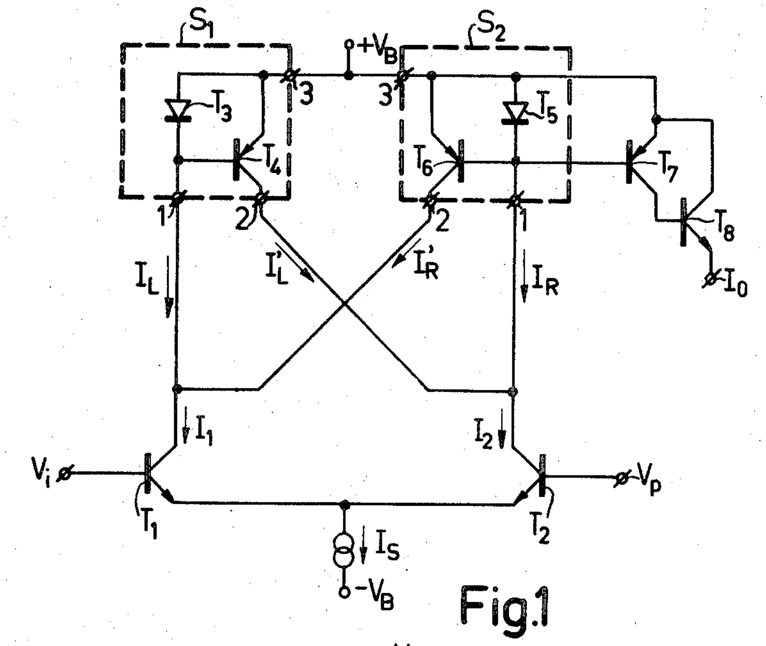

The invention relates to a transistor circuit comprising a first and a second control terminal for taking up control currents.

It is a particular object of the invention to provide a transistor circuit which may be used to form a trigger circuit having particularly advantageous properties.

Such trigger circuits have to satisfy widely different requirements which greatly depend upon the purpose for which a particular circuit is to be used. Thus, in one case importance will especially be attached to an accurate and independent adjustability of the two response values, i.e. the values of the input signal at which the trigger circuit changes from one stable state to the other and vice versa. In another case there will be particular interest in achieving a small hysteresis voltage and hence a small difference between the two response values of the trigger circuit, whereas in a third case the main requirement may be to have satisfactory supply voltage suppression and temperature independence. Furthermore in general the tendency will be to have a circuit which may be made in integrated-circuit form in a minimum surface area of a semiconductor body.

United States Patent No. 3,514,633 for example, describes a trigger circuit the primary object of which is to have an accurate and independent adjustability of the two response values. The trigger circuit described comprises two cross-coupled transistor pairs of opposite conductivity types. A reference voltage is applied to the base of one of the transistors of the first transistor pair and the trigger signal is applied to the base of the second transistor of this pair, the emitters of these transistors being connected to a current source through emitter resistors. The collectors of these transistors are connected to the bases of the transistors of the second transistor pair, the collectors of which in turn are cross-coupled to the emitters of the transistors of the first transistor pair and the emitters of which are connected through impedances to a terminal of the supply source.

Depending upon the value of the trigger signal one of the transistors of the first transistor pair and that transistor of the second transistor pair which is connected to the collector of the first-mentioned transistor are conducting. The collector current of the said transistor of the second pair produces a voltage across the emitter resistor of the second transistor of the first pair such as to cut off this transistor and hence the second transistor of the second pair also. The two response values of the trigger circuit are determined by the voltages produced across the emitter resistors in the two stable states, that is by the resistance values of these resistors and the value of the current delivered by the current source.

The latter feature means that great care is to be paid to this current source because variations of the current supplied by this source, which may be due to variations in the supply voltage or the temperature, result in variations of the response values. Further it will be apparent from the foregoing that depending upon the state of the trigger circuit the input transistor is either conducting or non conducting, with the result that considerable variations of the input impedance occur at the instant at which the trigger circuit passes from one stable state to the other stable state and *vice versa*. Hence particular care is to be paid to the impedance matching of the trigger circuit to the preceding control circuit in order to prevent instability during the transition. Finally the presence of resistors is a drawback from the point of view of integration technology because resistors in general occupy a comparatively large semi-conductor area.

It is an object of the invention to provide a transistor circuit which enables *inter alia* a trigger circuit to be realized in which the said problems are avoided. For this purpose the invention is characterized in that the transistor circuit further comprises a first and a second current mirror each comprising an input terminal, an output terminal and a sum terminal, the input terminal of the first current mirror together with the output terminal of the second current mirror being connected to the first control terminal, while the output terminal of the first current mirror together with the input terminal of the second current mirror is connected to the second control terminal.

The term "current mirror" is used herein to denote a transistor circuit having an input terminal, an output terminal and a sum terminal and further including semiconductor means connected to said current mirror terminals, said semiconductor means including a semiconductor junction element connected between the input and sum terminals and a transistor with its main current path connected between the output and sum terminals, the sum terminal carrying a current which is the sum of the currents at the input and output terminals, while the current at the output terminal under normal conditions is in a fixed ratio to the current at the input terminal, where the term "normal conditions" is to be understood to mean conditions such that the transistors of the current mirror are not saturated. This ratio between the current at the output and the current at the input will hereinafter be termed the mirror ratio.

The simplest and most frequently used current mirror comprises a transistor the base emitter path of which is shunted by a semiconductor junction, i.e. a diode, or a transistor connected as a diode, which is operated in the forward direction. The emitter-collector path of the transistor is connected between the output and sum terminals and the semiconductor junction element is connected between the input and sum terminals. If the geometries of the semiconductor junction and of the transistor are identical, the current through this semiconductor junction, the input current, neglecting the base current of the transistor, will be equal to the collector current of the transistor, the output current, so that the mirror ratio is unity. If the geometries of the semiconductor junction and of the transistor are different, a mirror ratio different from unity will occur. The advantage of the described structure of the current mirror is that the mirror ratio can accurately be fixed. In integrated circuits using vertical transistors this mirror ratio is determined substantially entirely by the ratio between the emitter areas of the transistors. By making the emitter area of the transistor, for example, twice that of the transistor connected as a diode, a mirror ratio of two is achieved with a high degree of accuracy. Obviously, instead of one transistor several transistors may be connected in parallel. In the case of lateral transistors such a parallel arrangement will even be the most obvious manner of achieving a mirror ratio different from unity. Finally, several more complex arrangements are possible which enable an even higher accuracy to be obtained or given impedance requirements to be satisfied.

The transistor circuit according to the invention contains active elements only and hence is particularly suited to be made in integrated circuit form. If the product of the mirror ratios of the current mirrors are made greater than unity, a trigger circuit is obtained the response values of which are determined by the ratio between the control currents, as will be shown more fully in the following description of the invention with reference to the Figures. This current ratio is entirely independent of the absolute values of these currents, resulting in a very satisfactory supply voltage suppression. Finally, if using two input transistors in a differential configuration for converting input voltages into the control currents, irrespective of the state of the trigger circuit both input transistors are conducting and when the circuit passes from one stable state to the other no abrupt impedance variation occurs, permitting simpler impedance matching to the control circuit.

If the product of the mirror ratios of the current mirrors is made less than unity, the transistor circuit operates as an amplifier, the amplification factor being determined by the value of the said mirror ratios.

Figure 2:
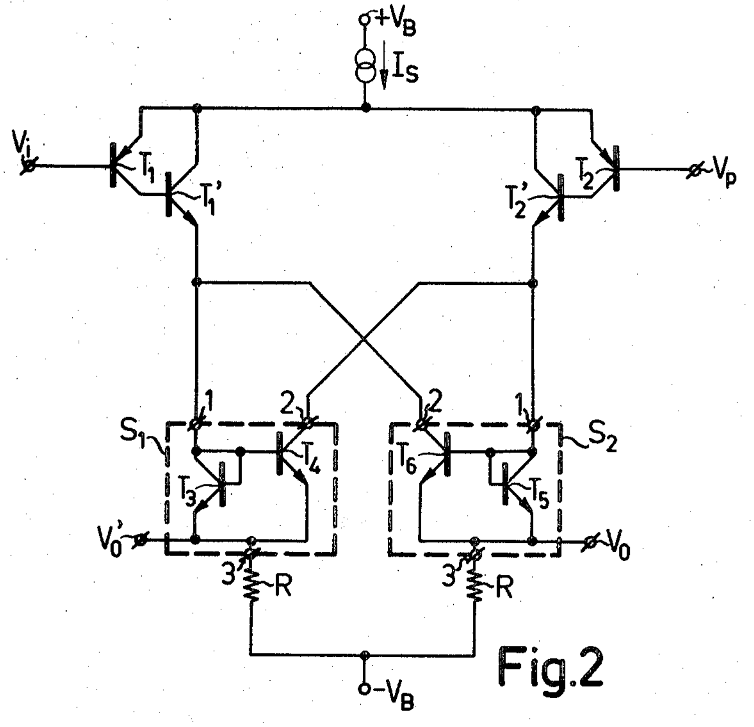
Figure 3:
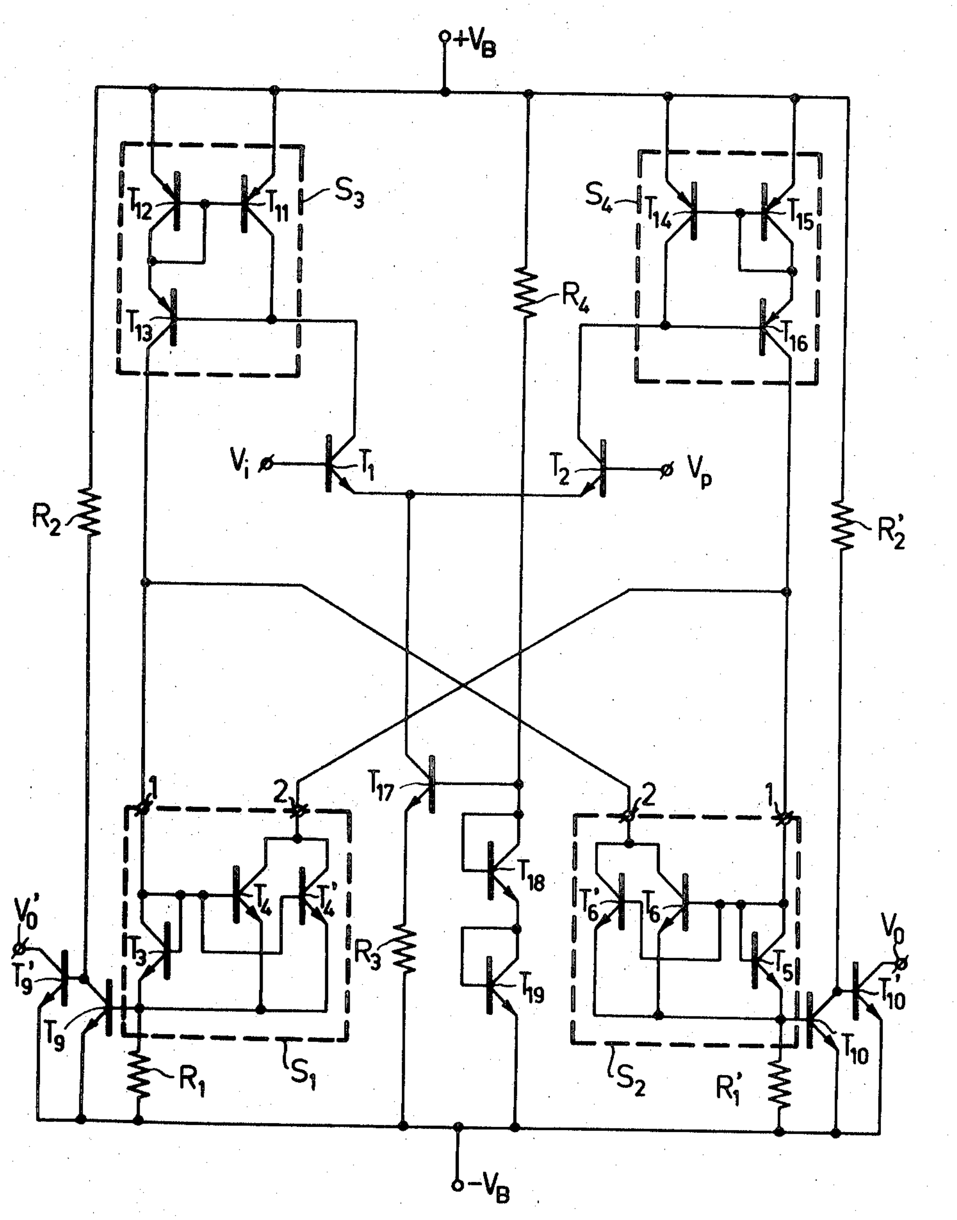

Embodiments of the invention will now be described, by way of example, with reference to the accompanying diagrammatic drawings, in which:

FIG. 1 is a circuit diagram of a first embodiment of a transistor circuit according to the invention, FIG. 2 is a circuit diagram of a second embodiment thereof, and FIG. 3 is a circuit diagram of a third embodiment.

Referring now to FIG. 1, there is shown a first embodiment of the transistor circuit according to the invention. The circuit comprises two input transistors $T_1$ and $T_2$ which are connected as a differential pair and the emitters of which are connected via a current source $I_s$ to the negative terminal $-V_B$ of the supply source. The base of the transistor $T_2$ is connected to a reference voltage $V_p$ and an input voltage $V_i$ is applied to the base of the transistor $T_1$.

The collector of the transistor $T_1$ is connected to an input terminal 1 of a first current mirror $S_1$ and also to an output terminal 2 of a second current mirror $S_2$. The collector of the transistor $T_2$ is connected to an input terminal 1 of the second current mirror $S_2$ and also to an output terminal 2 of the first current mirror $S_1$.

If the circuit is to be operated as a trigger circuit, the said current mirrors, which most generally are identical, have to satisfy the requirement that the product of the mirror ratios exceeds unity. The embodiments of these current mirrors shown in the Figure each comprise the parallel arrangement of a diode or a transistor connected as a diode $T_3$ or $T_5$ and the emitter base path of a transistor $T_4$ or $T_6$, respectively. The mirror ratio may simply satisfy the aforementioned requirement by replacing each of the single transistors $T_4$ and $T_6$ by a parallel arrangement of two or more transistors.

Depending upon the value of the input voltage $V_i$ the trigger circuit is in either of two possible stable states, i.e. a first stable state in which the first current mirror $S_1$ only passes current and a second stable state in which the second current mirror $S_2$ only passes current.

The operation of the trigger circuit may best be explained by assuming that at a given instant the input voltage $V_i$ has a very high value such that the transistor $T_2$ is completely cut off so that the current $I_2$ is zero. In this case the input current $I_R$, and hence the output current $I'_R$ also, of the second current mirror $S_2$ will also be zero. Thus, the control current $I_1$ passing through the input transistor $T_1$ acts entirely as the input current for the first current mirror $S_1$ and hence $I_L = I_1$. The output current $I_L'$ is zero because $I_2 = 0$, so that the transistor $T_4$ is completely saturated. If now the input voltage $V_i$ decreases, $I_1$ will decrease and $I_2$ will increase. The current $I_2$ is taken up by the output of the first current mirror $S_1$, so that $I_2 = I_L'$, which means that the second current mirror still does not pass input current and hence passes no output current, for the first current mirror has a mirror ratio exceeding unity, say $P_L$. Up to the instant at which the current ratio $I_2/I_1$, which ratio is imposed by the input voltage $V_i$, is equal to $P_L$ the first current mirror $S_1$ can take up the current $I_2$.

If owing to a decrease of the input voltage $V_i$ the current ratio $I_2/I_1$ increases further, the current mirror $S_1$ will no longer be capable of taking up the entire current $I_2$. Consequently, an input current $I_R$ will occur at the second current mirror. This input current $I_R$, however, entails an output current $I_R' = P_R I_R$, where $P_R$ is the mirror ratio of the second current mirror $S_2$. The output current $I_R'$ is withdrawn from the transistor $T_1$, so that the input current $I_L$ of the first current mirror $S_1$ decreases. The decrease of this input current $I_L$ involves a decrease of the output current $I_L'$ with the result that the input current $I_R$ of the second current mirror increases further. This process continues until ultimately the input current $I_L$ of the first current mirror and hence its output current $I_L'$, are zero. Then the trigger circuit is in its second stable state in which the second current mirror $S_2$ only passes current and in which $I_R = I_2$ and $I_R' = I_1$. When the input voltage $V_i$ decreases further, $I_2/I_1$ will increase and consequently $I_R$ will increase and $I_R'$ will decrease, so that the transistor $T_6$ becomes progressively saturated.

When the input voltage $V_i$ increases again, the latter stable state will persist up to the instant at which the current ratio $I_1/I_2$ imposed by the input voltage becomes greater than $P_R$, for at this instant a current $I_L$ and hence a current $I_L' = P_L I_L$ will occur again, so that the aforedescribed process is performed in the reverse sense and the second current mirror no longer passes current.

From the above it will be apparent that the response values of the trigger circuit are determined by the current ratio $I_1/I_2$ and are expressed by $I_1/I_2 = 1/P_L$ and $I_1/I_2 = P_R$ respectively. These current ratios are entirely independent of the current supplied by the current source $I_s$, with the result that variations in this current owing to supply voltage variations or temperature variations have no influence at all on the response values of the trigger circuit. Thus one of the features of this circuit is a highly satisfactory supply voltage suppression.

It will further be apparent from the above that the two input transistors $T_1$ and $T_2$ can pass current in both stable states and that at the transition from one stable state to the other no abrupt changes in the currents passed by the transistors $T_1$ and $T_2$ and hence no abrupt change in the input impedance occur. Consequently the reaction to the input is very small.

The hysteresis voltage, i.e. the voltage difference between the two response values, may be very small in the trigger circuit according to the invention, for there is a logarithmic relationship between the input voltage $V_i$ and the currents $I_1$ and $I_2$:

$$V_i = V_p + (kT/q 1n\ (I_1/I_2)$$

where $k$ is Boltzmann's constant, $T$ is absolute temperature and $q$ is the charge on an electron. Using the expressions for the response value the hysteresis voltage $V_H$ is:

$$V_H = (kT/q)\ 1n\ P_L P_R.$$

As has been mentioned hereinbefore, the product $P_L.P_R$ must be greater than unity. If $P_L = P_R = 2$, for example, the hysteresis voltage $V_H$ is 35 mV, whereas for $P_L = P_R = 1.1$ the hysteresis voltage $V_H$ is only 5 mV. Thus an appropriate choice of $P_L$ and $P_R$ enables a very small hysteresis voltage to be obtained.

Finally the trigger circuit according to the invention has the advantage of comprising active elements only so that in the case of integration only a small semiconductor area is required.

In order to read out the state of the trigger circuit, an additional transistor $T_7$ may be used the emitter-base path of which is connected in parallel with the diode $T_5$. Depending upon which of the two current mirrors $S_1$ and $S_2$ passes current, the transistor $T_7$ will or will not deliver an output current. In this design of the read-out circuit attention must be paid to the value of the base current of the transistor $T_7$, for this base current influences the mirror ratio of the current inverter circuit $S_2$. When the transistor $T_7$ is of the lateral pnp type, the base current may be considerable. This may be improved by the addition of an additional npn transistor $T_8$ the base-collector path of which shunts the collector-emitter path of the transistor $T_7$. This provides an additional current gain permitting the base current of the transistor $T_7$ to be appreciably reduced.

The embodiment shown in FIG. 1 using two transistors connected as a differential pair as input stages provides the advantage that the input impedance is high and that depending upon the mirror ratios chosen the hysteresis voltage may be very small. If, however, a larger hysteresis is desired, the transistors $T_1$ and $T_2$ may be replaced by two resistors as input stages. Connecting one of the resistors to a reference voltage and applying the input voltage to the second resistor again provides a trigger circuit controlled by the input voltage. However, the relation-ship between the input voltage and the control currents is no longer logarithmic but is linear, so that the hysteresis voltage is far greater than in the circuit shown in FIG. 1. A disadvantage will be the increased reaction to the input. It is also possible to use input currents instead of input voltage which input currents acts as the control currents.

The embodiment of the trigger circuit according to the invention shown in FIG. 1 has the advantage that only a very small supply voltage is required. A disadvantage is that the mirror ratios of the current mirrors employing lateral pnp transistors is greatly dependent upon the value of the current gain factor $\alpha'$ of each of the transistors used owing to the fact that this current gain factor in general is small and hence the base currents of the transistors $T_4$ and $T_6$ play a part. Owing to the spread in the current gain factor $\alpha'$ due to manufacturing tolerances there will also be a spread in $P_L$ and $P_R$ and hence a spread in the response values of the trigger.

Obviously this spread may be reduced by using complicated current mirrors which are less dependent upon the current gain factors. However, it is simpler to accomplish this purpose by using transistors of the npn type as the current mirrors, as is shown in FIG. 2, in which corresponding elements are designated by the same reference numerals as in FIG. 1.

The current inverter circuits $S_1$ and $S_2$ comprise transistors $T_4$ and $T_6$, respectively, and transistors $T_3$ and $T_5$ connected as diodes, respectively. The structure of the current mirrors entirely corresponds to that shown in FIG. 1, with the single difference that transistors of the npn type are used. Owing to the large value of the current gain factor $\beta$ of the npn transistors, any spread in $\beta$ has a substantially negligible influence on the amplification of the current mirrors. Hence this amplification is determined substantially only by the area ratios of the transistors and the transistors connected as diodes.

The input transistors $T_1$ and $T_2$ are of the pnp type. To ensure a high input impedance npn transistors $T_1'$ and $T_2'$ have been added in a manner corresponding to that of the transistor $T_8$ in FIG. 1. Naturally read-out may be effected in a manner identical to that used in FIG. 1. Alternatively read-out may be effected in the manner shown in the Figure by connecting the common emitters of the transistors $T_3$, $T_4$ and $T_5$, $T_6$ respectively, i.e. the sum terminals 3, to the negative terminal $-V_B$ of the supply source through resistors R. The voltages as $V_O$ and $V_O'$ across these resistors may then be used as the output voltage.

In the circuit shown in FIG. 2 the current source $I_2$ will generally be built from pnp-transistors. Alternatively, this current source may comprise an npn current source and an pnp current mirror.

To enable the current mirrors $S_1$ and $S_2$ to use transistors of the npn type as well as to use input transistors of the npn type, the embodiment shown in FIG. 3 may be employed. In FIG. 3, corresponding elements are designated by the same reference numerals as in FIGS. 1 and 2.

The embodiment shown in this Figure comprises npn input transistors $T_1$ and $T_2$ which are fed from a current source comprising transistors $T_{17}$, $T_{18}$ and $T_{19}$ and a resistor $R_3$. From the foregoing description it will be clear that a simpler current source may also be used because owing to the circuit according to the invention, this current source need not satisfy stringent requirements. The current inverter circuits $S_1$ and $S_2$ comprise npn transistors $T_3$, $T_4$, $T_4'$ and $T_5$, $T_6$, $T_6'$ respectively. Assuming all the transistors to have equal surface areas the mirror ratios of these current mirrors will be 2. The operation of the cross-coupled current mirrors $S_1$ and $S_2$ is identical to that of the current mirrors $S_1$ and $S_2$ shown in FIGS. 1 and 2. Thus the coupled input and output terminals of these current mirrors must receive control currents. These control currents could be supplied by means of a differential amplifier with pnp transistors as shown in FIG. 2. In FIG. 3 a different input stage is used in order to employ input transistors of the npn type.

The input stage contains a differential amplifier with npn transistors $T_1$ and $T_2$ are coupled to the current mirrors $S_1$ and $S_2$ by two further current mirrors $S_3$ and $S_4$. These current mirrors $S_3$ and $S_4$ in known manner comprise pnp transistors $T_{11}$, $T_{12}$, $T_{13}$ and $T_{14}$, $T_{15}$, $T_{16}$ respectively, the mirror ratios being substantially unity in the embodiment shown. Obviously a spread again occurs owing to the spread in the current gain factors $\alpha'$ of the pnp transistors. However, provided that the mirror ratios of the two current mirrors $S_3$ and $S_4$ are equal, which is the case to a good approximation when the current mirrors are integrated on the same semiconductor surface, the absolute value of this gain does not have any influence on the response values of the trigger circuit because only the ratio between the currents plays a part. The input terminals of current mirrors $S_3$ and $S_4$ receive the collector currents of transistors $T_1$ and $T_2$, respectively. The output currents of current mirrors $S_3$ and $S_4$ are applied to the cross-coupled current mirrors $S_1$ and $S_2$. As a consequence, the output currents of current mirrors $S_3$ and $S_4$ merely act as the control currents, similar to currents $I_1$ and $I_2$ in FIG. 1.

The current mirrors $S_1$ and $S_2$ here also are connected to the negative terminal of the supply source through resistors $R_1$ and $R_1'$ respectively. The output voltages across these resistors are applied to transistors $T_9'$ and $T_{10}'$ respectively, after amplification through transistors $T_9$ and $T_{10}$ respectively. The output circuit of FIG. 3 is therefore similar to the output circuit of FIG. 2. It may be considered to entirely dispense with the resistors $R_1$ and $R_1'$, however, this will impair the switching speed of the transistors $T_9$ and $T_{10}$. The operation of the circuit shown in FIG. 3 is similar to the circuit operation described with reference to FIGS. 1 and 2.

It will be appreciated from the foregoing that the transistor circuit according to the invention is not restricted to the embodiments shown in the Figures, but that many variants are possible both with respect to the design of the current mirrors and to that of the read-out and supply circuits.

It is, for example, possible to determine the mirror ratio of the current mirror by means of resistors. If a resistor is inserted in series with the diode (e.g. diode $T_3$ in FIG. 1) and a resistor in the emitter lead of the transistor (e.g. transistor $T_4$ in FIG. 1) it is possible to determine the mirror ratio almost entirely by the ratio between these resistors. If one of these resistors is adjustable it will therefore be possible to adjust the product of the mirror ratios. This means that it is possible to use the same circuit as a trigger circuit (product of mirror ratios greater than one) and as an amplifier (product of mirror ratios smaller than one), whereas in these cases the hysteresis or the amplification factor is adjustable.

What is claimed is:

1. A transistor circuit comprising a first and a second control terminal for taking up control currents, a first current mirror circuit and a second current mirror circuit, each current mirror comprising an input terminal, an output terminal and a sum terminal, means directly connecting the input terminal of the first current mirror together with the output terminal of the second current mirror to the first control terminal, means directly connecting the output terminal of the first current mirror together with the input terminal of the second current mirror to the second control terminal, and means connecting the sum terminals to a source of voltage.

2. A transistor circuit as claimed in claim 1, further comprising first and second input stages each having its input coupled to a source of input voltage, and means connecting the first and second control terminals to the outputs of said first and second input stages, respectively, for converting the input voltages into said control currents.

3. A transistor circuit as claimed in claim 1 further comprising two input stages each including an input terminal, an output terminal and a common terminal, means connecting the common terminals of the two input stages to one another and to a current source, means connecting the first and second control terminals to the output terminals of the first and second input stages, respectively, so that input voltages applied to the input terminals are converted into the control currents which appear at the output terminals.

4. A transistor circuit as claimed in claim 1 wherein the product of the mirror ratios of the first and second current mirrors exceeds unity whereby the transistor circuit functions as a trigger circuit.

5. A transistor circuit as claimed in claim 1 wherein the mirror ratios of the first and second current mirrors are chosen so that the product thereof is less than one whereby the transistor circuit functions as a linear amplifier.

6. A transistor circuit as claimed in claim 2 wherein the sum terminal of each of the current mirrors is connected via an impedance element to a point of fixed potential so that an output signal may be derived across said impedance elements.

7. A transistor circuit as claimed in claim 6, further comprising means connecting at least the sum terminal of one of the current mirrors to an input terminal of an amplifier circuit from the output of which an amplified output signal of the transistor circuit may be derived.

8. A transistor circuit as claimed in claim 2 wherein the input stages and the current mirrors comprise transistors of the same conductivity type, the connections between the first and the second input stage and the first and second current mirrors being established by the interposition of a third and a fourth current mirror, respectively, which comprise transistors of the opposite conductivity type.

9. A transistor circuit as claimed in claim 1 wherein each of said current mirrors comprises a transistor with its emitter-collector path connected between the sum terminal and the output terminal, and a semiconductor junction element connected between the sum terminal and the input terminal.

10. A transistor circuit comprising, first and second control terminals, first and second current mirrors each comprising an input terminal, an output terminal, a sum terminal, and each current mirror further including semiconductor means connected to said current mirror terminals so as to maintain a fixed ratio between the current at the output terminal and the current at the input terminal, means directly connecting the input terminal of the first current mirror and the output terminal of the second current mirror to the first control terminal, means directly connecting the output terminal of the first current mirror and the input terminal of the second current mirror to the second control terminal, whereby the output currents of the first and second current mirrors can flow to the second and first control terminals, respectively, and means connecting the sum terminals to a source of voltage.

11. A transistor circuit as claimed in claim 10 wherein said semiconductor means comprises, a transistor with its emitter-collector current path connected between the sum terminal and the output terminal, a semiconductor rectifying junction element connected between the sum terminal and the input terminal, and means connecting the input terminal to the base of the transistor.

12. A transistor circuit as claimed in claim 11 wherein said semiconductor junction element comprises a diode connected between the emitter and base of the transistor and polarized with the same polarity as the emitter-base junction of the transistor.

13. A transistor circuit as claimed in claim 10 wherein said semiconductor means comprises, first and second transistors with their emitter-collector paths connected in parallel between the sum terminal and the output terminal, a semiconductor rectifying junction element connected between the sum terminal and the input terminal, and means connecting the input terminal to the base electrodes of the transistors.

14. A transistor circuit as claimed in claim 10 further comprising first and second transistors, means connecting the control electrode of at least one of the transistors to a source of control voltage, and means connecting the first and second control terminals to the output electrodes of said first and second transistors whereby the control voltage is converted into control currents at said first and second control terminals.

15. A transistor circuit as claimed in claim 14 wherein the mirror ratios of said first and second current mirrors are equal and are chosen so that the product thereof is greater than one, whereby the transistor circuit functions as a trigger circuit.

16. A transistor circuit as claimed in claim 14 wherein the mirror ratios of said first and second current mirrors are equal and are chosen so that the product thereof is less than one, whereby the transistor circuit functions as a linear amplifier.

17. A transistor circuit as claimed in claim 10 wherein said semiconductor means comprises, a transistor with its emitter-collector current path connected between the sum terminal and the output terminal, a semiconductor rectifying junction element connected across the emitter-base circuit of the transistor and between the sum terminal and the input terminal.

* * * * *

PO-1050
(5/69)

UNITED STATES PATENT OFFICE
CERTIFICATE OF CORRECTION

Patent No. 3,805,093 Dated April 16, 1974

Inventor(s) ANDREAS MARIE LAURENTIUS HODEMAEKERS

It is certified that error appears in the above-identified patent and that said Letters Patent are hereby corrected as shown below:

IN THE TITLE PAGE after "Marie" insert -- Laurentius --;

Signed and sealed this 5th day of November 1974.

(SEAL)
Attest:

McCOY M. GIBSON JR.
Attesting Officer

C. MARSHALL DANN
Commissioner of Patents